(12) United States Patent
Boberg et al.

(10) Patent No.: US 8,566,954 B2
(45) Date of Patent: Oct. 22, 2013

(54) METHOD AND APPARATUSES FOR AUTHORISING PROVISION OF INDIRECTED CONTENT ASSOCIATED WITH A PRESENTITY OF A PRESENCE SERVICE

(75) Inventors: Christer Boberg, Tungelsta (SE); Bulent Gecer, Nacka (SE); Mikael Klein, Huddinge (SE); Sofie Lassborn, Sollentuna (SE); Anders Lindgren, Älvsjö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 445 days.

(21) Appl. No.: 12/865,445

(22) PCT Filed: Feb. 8, 2008

(86) PCT No.: PCT/EP2008/051581
§ 371 (c)(1),
(2), (4) Date: Jul. 30, 2010

(87) PCT Pub. No.: WO2009/097902
PCT Pub. Date: Aug. 13, 2009

(65) Prior Publication Data
US 2011/0004942 A1      Jan. 6, 2011

(51) Int. Cl.
*G06F 21/00* (2013.01)
(52) U.S. Cl.
USPC .............................................. 726/28; 726/4
(58) Field of Classification Search
USPC ....................................................... 726/4, 28
See application file for complete search history.

(56) References Cited

U.S. PATENT DOCUMENTS

| | | | |
|---|---|---|---|
| 7,219,153 B1* | 5/2007 | Day | 709/229 |
| 2004/0107143 A1* | 6/2004 | Niemi | 705/26 |
| 2006/0104306 A1* | 5/2006 | Adamczyk et al. | 370/466 |
| 2007/0021138 A1* | 1/2007 | Allen et al. | 455/518 |
| 2007/0214243 A1* | 9/2007 | Bao et al. | 709/220 |
| 2008/0134259 A1* | 6/2008 | He | 725/91 |

FOREIGN PATENT DOCUMENTS

EP          1873976 A1 *  1/2008

OTHER PUBLICATIONS

Dostal P: "Image Application Usage, OMA-PAG-2008-0029ROI" Open Mobile Alliance, [Online] Jan. 30, 2008, pp. 1-5, XP002530306 Retrieved from the Internet; URL:http://member.openmobilealliance.org/ftp/Public_documents/PAG/2008/0MA-PAG-2008-0029R0I-INP_PRS2_Icon_App_Usage_Introduction.zip> figures 2,4,6,8-10.

\* cited by examiner

*Primary Examiner* — Lisa Lewis (57) ABSTRACT

The invention provides a method of authorizing provision of in-directed content to a user of an IPcommunications network. The in-directed content is associated with a presentity subscriber of a presence service, the presence service including authorization rules regarding users to which the in-directed content may be provided. The in-directed content is stored at a content server that is not controlled by the presence service. The method includes receiving at an authorization proxy in the network a request from the user to be provided with the in-directed content, and identifying the presentity subscriber associated with the requested in-directed content. The authorization proxy retrieves the authorization rules to verify that the user is authorized to receive the in-directed content. Subject to the verification, the in-directed content is provided from the content server the user.

17 Claims, 4 Drawing Sheets

METHOD AND APPARATUSES FOR AUTHORISING PROVISION OF INDIRECTED CONTENT ASSOCIATED WITH A PRESENTITY OF A PRESENCE SERVICE

TECHNICAL FIELD

The present invention relates to the provision of in-directed media content to a user accessing an IP communications network, particularly, but not exclusively the IP Multimedia Subsystem (IMS).

BACKGROUND

The Internet Protocol (IP) has become established for providing multimedia services over telecommunications networks. The IP Multimedia Subsystem (IMS) is the technology defined by the Third Generation Partnership Project (3GPP) to provide IP Multimedia services over mobile communication networks. IP Multimedia services provide a dynamic combination of voice, video, messaging, data, etc. within the same session.

The IMS makes use of the Session Initiation Protocol (SIP) to set up and control calls or sessions between user terminals. SIP signals use the Session Description Protocol (SDP) to describe and negotiate the media components of the session. Whilst SIP was created as a user-to-user protocol, the IMS allows operators and service providers to control user access to services and to charge users accordingly.

Figure 1:
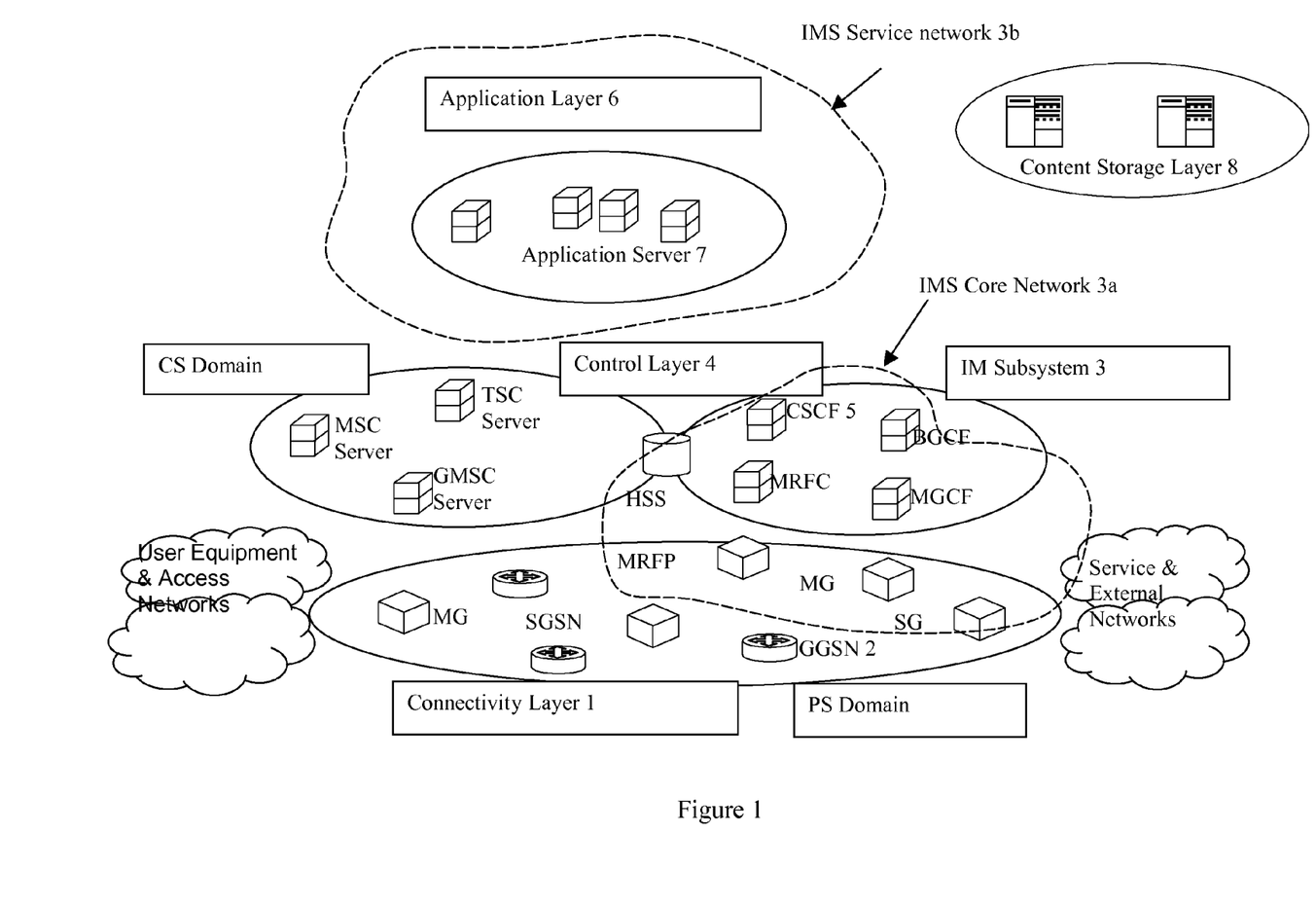
FIG. 1 is a schematic depiction of an IMS network in association with a mobile network architecture of a General Packet Radio Service (GPRS) access network.

FIG. 1 illustrates schematically how the IMS fits into the mobile network architecture in the case of a General Packet Radio Service (GPRS) access network. As shown in FIG. 1 control of communications occurs at three layers (or planes). The lowest layer is the Connectivity Layer 1, through which signals are directed to/from client user equipment, UE, accessing the network. A gateway GPRS support node (GGSN) 2 acts as an interface between the GPRS backbone network and other networks (radio network and the IMS network). The middle layer is the Control Layer 4, and at the top is the Application Layer 6.

The IMS 3 includes a core network 3a, which operates over the middle, Control Layer 4 and the Connectivity Layer 1, and a Service Network 3b. The IMS core network 3a includes nodes that send/receive signals to/from the GPRS network via the GGSN 2a at the Connectivity Layer 1 and network nodes that include Call/Session Control Functions (CSCFs) 5, which operate as SIP proxies within the IMS in the middle, Control Layer 4. The top, Application Layer 6 includes the IMS service network 3b. Application Servers (ASs) 7 are provided for implementing IMS service functionality.

FIG. 1 also shows a Content Storage Layer 8, which includes servers that store data, referred to as "content". Some applications may be configured such that a user can request provision of content information from one of these content servers. The user may be informed that the information content is available from a server at a particular location. This information content is referred to as in-directed content, and the server is referred to as a Content Server. The Content Server may be at any location accessible over the internet. In these cases, it is left to the individual user to decide if and when to request retrieval of the content. The method of informing the user is to send a message to the user with an indication that the information is available together with the location from which it can be retrieved. This approach is useful when the data itself may be quite large (e.g. when the information includes multimedia data such as icons, media files etc.).

An example of where in-directed content may be used is in Presence and List Management services. A Presence service allows a user to subscribe to presence information so as to be able to see if other users are available and willing to communicate. A user's presence information (presence state) may include, for example, whether or not they are on-line, whether or not they are busy or willing to communicate, or their geographical location. An AS, referred to as a Presence Server controls the presence service. A user who provides presence information to a presence service is referred to as a presence entity, or presentity, while a user who is kept informed about the presence states of other users is referred to as a watcher. To control the watchers that are permitted to see the presence state of a presentity, and the presence states that any particular watcher is permitted to see, a set of authorization rules is maintained, to which the presence server can refer. These rules include a list of the users who are authorized to be watchers for each presentity. The authorization rules are maintained in an XML document by an XML Document Management Server (XDMS).

Many Presence services in use today employ the SIMPLE based solution defined by IETF, and used by 3GPP and the Open Mobile Alliance (OMA). Content in-direction is often used for large multimedia data. When the presence state of a presentity changes, this information content is provided to the content server by the presentity, and then a link to that content is included in presence data that is sent (published) to the presence server. The presence server then notifies all concerned and authorised watchers about the change of presence data and the watcher fetches the information from the content server, pointed out by the link included in the presence data.

Before the information is provided to the watcher, it is necessary to verify that the watcher is authorised to receive the information. However, there is currently no standard way to verify authorize that the watcher is authorised when fetching the information from the content server. Consequently, presence service providers each use their own, more or less complex and proprietary solution to make sure that the watcher is authorised to see the data.

The present invention has been conceived with the foregoing in mind.

SUMMARY

According to a first aspect of the invention, there is provided a method of authorising provision of in-directed content to a user of an IP communications network. The in-directed content is associated with a presentity subscriber of a presence service, the presence service including authorisation rules regarding users to which the in-directed content may be provided. The in-directed content is stored at a content server that is not controlled by the presence service. The method includes receiving at an authorisation proxy in the network a request from the user to be provided with the in-directed content, and identifying the presentity subscriber associated with the requested in-directed content. The authorisation proxy retrieves the authorisation rules to verify that the user is authorised to receive the in-directed content. Subject to the verification, the in-directed content is provided from the content server the user.

It is an advantage that the authorisation proxy is able to make use of the authorisation rules of the presence service to verify that a user, requesting in-directed content, is allowed to receive the content. This means that a separate, bespoke verification procedure is not required.

Embodiments may further comprise receiving, at a presence server in the network, a notification that the in-directed content is available. The notification includes an indication of a location from which the in-directed content can be retrieved. The presence server checks the authorisation rules and forwards the notification to users authorised to receive the in-directed content. The notification may comprise presence information published by the presentity to the presence server via a SIP PUBLISH request. The indication of the location of the in-directed content may be a URL.

The in-directed content associated with the presentity may comprise data uploaded to the content server from the presentity. The uploaded data may include information identifying the presentity, and the step of identifying the presentity may comprise obtaining the information identifying the presentity from the content server. Preferably, the authorisation proxy forwards the request from the user to the content server, and the content server responds by providing the information identifying the presentity to the authorisation proxy.

In embodiments of the invention, the request from the user includes an identifier identifying the presentity. The identifier may be inserted into the URL prior to forwarding of the notification to the authorised users, the URL being sent with the request from the user to the authorisation proxy so that the authorisation proxy can identify the presentity. The identifier may be inserted into the URL by the presentity, or by the presence server.

Alternatively, or additionally, the authorisation proxy may be made presence aware, receiving information updates that include information identifying the presentity associated with the in-directed content. The authorisation proxy may be configured, upon receiving the request for in-directed content, to make use of the presentity's own presence data to ascertain which presence element is associated with the in-directed content. The authorisation proxy may use a SIP Subscribe for presence R-URI to obtain the presentity's own presence data.

In embodiments of the invention, the authorisation rules comprise an XML rules document provided from an XML document server.

The IP communications network may comprise the IMS.

According to a second aspect of the present invention, there is provided a network node of an IP communications network comprising an authorisation proxy operable to receive from a user a request for in-directed content. The in-directed content is associated with a presentity subscriber of a presence service. The in-directed content is stored at a content server that is not controlled by the presence service. The authorisation proxy is configured to verify that the user is authorised to receive the requested in-directed content, in accordance with authorisation rules of the presence service.

The network node may be configured, on receipt of the request, to retrieve an authorisation rules document from a document server. The network node may be configured to obtain an identification of the presentity prior to verification of authorisation of the user.

In embodiments of the invention, the authorisation proxy is co-located with a presence server providing the presence service. Alternatively, the authorisation proxy may be co-located with a content server, providing the in-directed content, or a modified part thereof.

According to a third aspect of the present invention there is provided User Equipment, UE, for accessing an IP communications network that includes a presence service. The UE is configured to provide an indication to the presence service that in-directed content is available to be downloaded from a content server by authorised users of the presence service. The UE is further configured to provide an identifier of the UE associating it with the in-directed content.

The UE may be configured to insert the identifier into a URL that identifies a location of the in-directed content at the content server.

According to a fourth aspect of the present invention there is provided User Equipment, UE, for accessing an IP communications network that includes a presence service. The UE is notified of in-directed content available to be downloaded from a content server. The in-directed content is associated with a presentity subscriber of the presence service. The UE is configured to send a message to the network requesting the in-directed content and to include an identifier of the presentity in the request.

DETAILED DESCRIPTION

Figure 2:
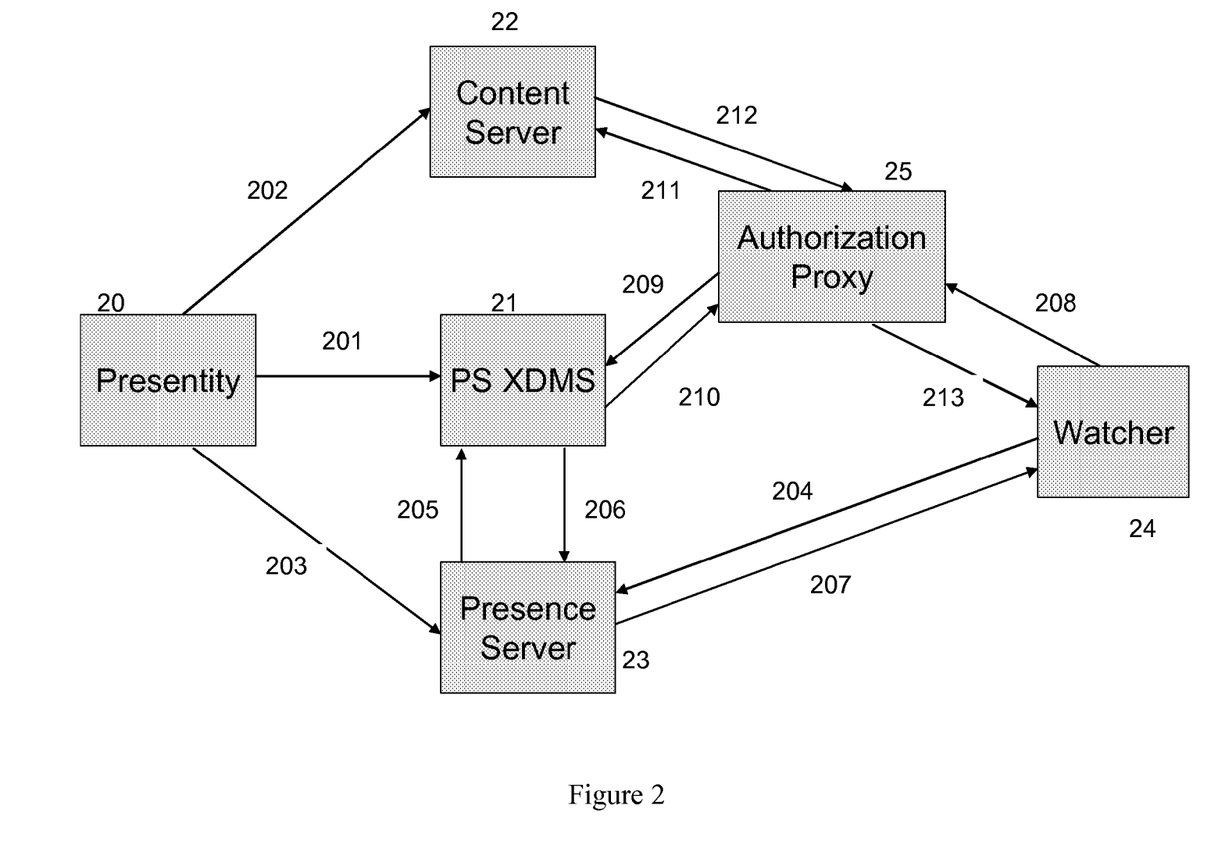
FIG. 2 illustrates the entities, their connectivity and signal flows for a method and system according to an embodiment of the invention.

Referring to FIG. 2, the entities concerned are: a presentity 20; a presence XML document management server (PS XDMS) 21 in the IMS for storing and providing the presence service authorisation rules documents to other entities when required; a content server 22 in the IMS from which the in-directed content will be provided; a presence server 23 in the IMS controlling the provision of the presence service to subscribers; a watcher 24, potentially being just one of a number of watchers that subscribe to the presence service; and an authorisation proxy 25 in the IMS. For the purposes of the discussion below, the authorisation proxy is shown and described as a separate entity or network node. Although this could well be the case, it is to be understood that the authorisation proxy may be co-located with, or its functions implemented in the same entity as one of the other entities, for example the presence server 23, or the content server 22, or it could form part of a modified content server.

Figure 3:
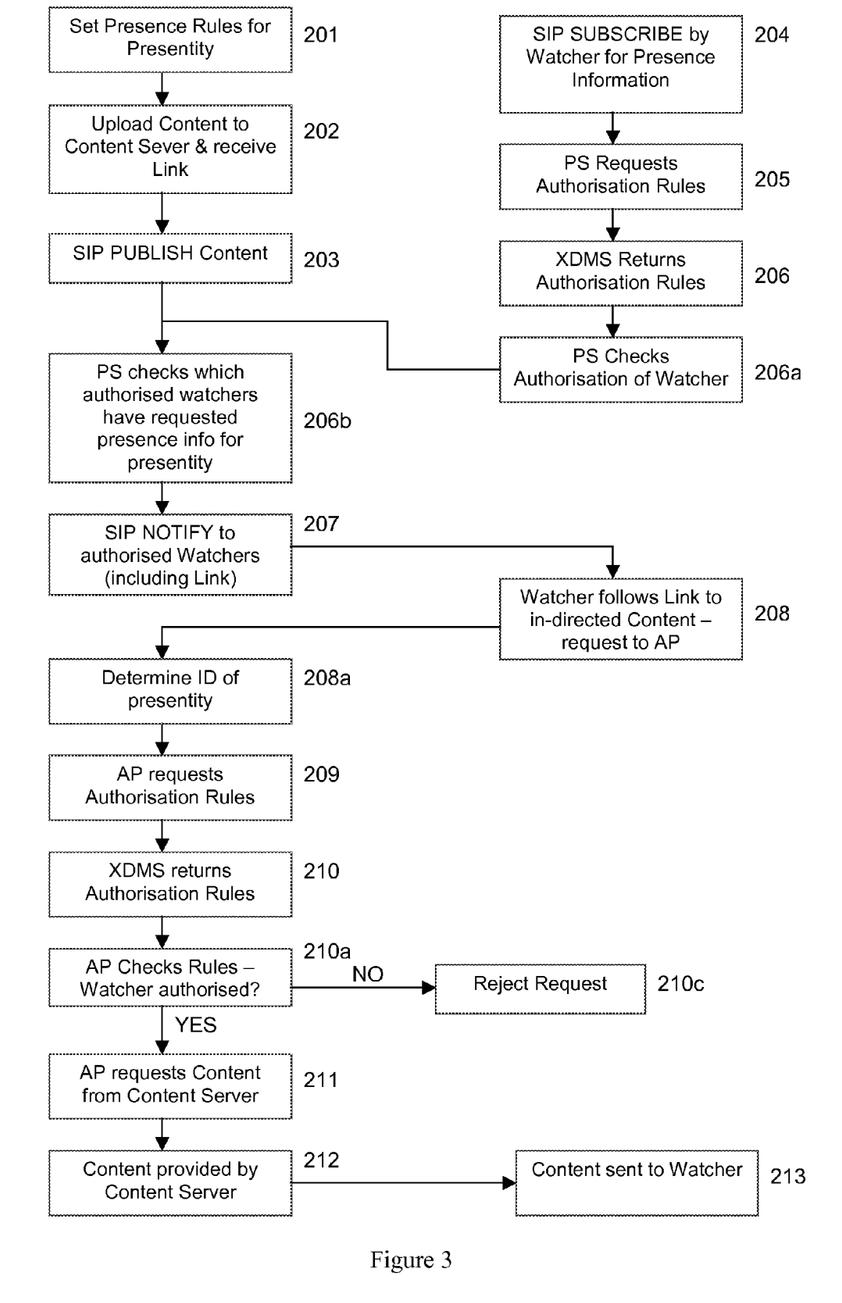
FIG. 3 is a flow chart illustrating the method steps of a method according to the invention.

Referring to FIGS. 2 and 3, initially, at step 201, the presentity 20 sets the presence authorization rules in the presence XDMS 21. The rules are stored in the form of an XML document. These rules determine the watchers that are allowed to see the presence data of the presentity 20 and also the presence data that each watcher is allowed to see.

At step 202, the presentity 20 uploads content (that will subsequently be used as in-directed content) to the content server 22 and receives back from the content server 22 a link to the stored content. Note that the content server 22 is not "presence aware", meaning that it is not a part of the presence service as such, does not have access to the presence authorisation rules, and the presence server 23 does not have any control over the content server 22 or the in-directed content stored there. In other words, the content server does not know that it is part of a presence service. It only receives messages to store or fetch content. The content uploaded to the content server 22 by the presentity 20 may or may not be related to the presence service. For example, it could be a file containing graphics for display of an icon used to illustrate the presence state of the presentity 20, or it could be some other data, completely unrelated to the presence service. For example, the content server 22 could be a Location Server, an Address Book server containing vCard information, or a media server containing personalised ring tones or other personal information.

At step 203, the presentity 20 sends a publication (SIP PUBLISH message) to the presence server 23 including the link pointing to the content uploaded at the content server 22.

At step 204, which may occur before or after steps 202 and 203 above, the watcher 24 subscribes for presence information related to the presentity 20 by sending a SIP SUBSCRIBE message to the presence server 23. This is followed, at step 205, by the presence server 23 requesting the presence authorization rules from the presence XDMS 21. At step 206, the presence XDMS returns the authorisation rules document to the presence server 23. The rules document includes a list of authorised watchers for the presentity 20. The rules also include the Presence Content Rules that state what information may be sent to each watcher. At step 206*a* (see FIG. 3) the presence server checks the rules to confirm the authorisation of the watcher 24.

Thus, after the authorization procedure has been completed, and after receiving the SIP PUBLISH message from the presentity 20 at step 203, at step 206*b* of FIG. 3, the presence server 23 checks which authorised watchers have requested the updated presence data relating to the presentity 20. Assuming that watcher 24 is authorised, then at step 207, the presence server 23 sends a SIP NOTIFY message to watcher 24 (and any other authorised watchers that have requested the updated presence data). The SIP NOTIFY message sent to each of the watchers includes the link to the in-directed content at the content server 22.

At step 208, the watcher 24 (or the client representing the watcher) after receiving the SIP NOTIFY message and detecting that there is in-directed content in the information it contains, follows the link to fetch the indirectly stored content, by sending a request to the IMS using the location address specified in the link. This request is routed to the Authorization Proxy, AP 25.

The Authorisation Proxy 25 is aware that it needs to use the presence service authorisation rules to check for authorization of this content request. That is to say that the Authorisation Proxy 25 is configured so that, on receiving the request from the watcher 24, it does not forward the request to the content server 22. Instead it carries out an authorisation confirmation procedure. To do this it needs to know both the identity of the watcher 24 (which it knows from the request received) and also the identity the presentity 20. Thus, at step 208*a* the authorisation proxy 25 first determines the ID of the presentity 20. There are a variety of ways in which the system can be configured to do this. Some of these are discussed in more detail below.

At step 209, the authorisation proxy 25 requests provision of the authorisation rules from the presence XDMS 21. At step 210, the presence XDMS 21 returns the authorisation rules document. At step 210*a* (see FIG. 3), the Authorisation Proxy 25 now checks the authorisation rules document to determine if the received identity of the watcher 24 has been authorised by the presentity 20 to see the in-directed content. Note that the authorisation procedure of step 210*a* is similar to that performed by the presence server 23 after retrieving the authorisation rules from the presence XDMS 21 at steps 205-206.

If the authorisation is not successful (i.e. the authorisation rules do not include the watcher 24 as being authorised to receive the in-directed content), then the request from the watcher 24 is rejected (step 210*b*). Note that under most normal circumstances if the watcher was not authorised then the presence server 23 would not have sent the link to the watcher 24 at step 207. However, the watcher 24 might have been authorised at one time to see the indirect content and have received the link at that time. If the presentity 20 then amends its authorisation rules and blocks the watcher 24, but the watcher 24 still has the link saved, the watcher 24 could try to access the content after it has been blocked. The presentity 20 may have changed the document behind the link after the watcher's authorisation was removed. Another possibility that the present system guards against, is if the watcher 24 has received the content link from another third-party user. Also, an unfriendly watcher may attempt to use a trial and error approach to access the content without having received the link. For example, the unfriendly watcher may use its own content links as a start and randomly modify parts of the link.

If the authorisation at step 210*a* is successful, and that the watcher 24 has been authorised to receive the content, then at step 211 the Authorisation Proxy 25 requests the data from the content server 22. At step 212, the content server 22 responds by sending the in-directed content data back to the authorisation proxy 25. At step 213, the Authorisation Proxy 25 in turn forwards the data to the watcher 24. Alternatively, depending on the configuration of content server 22 and the Authorisation proxy 25, the data may be forwarded directly from the content server 22 to the watcher 24.

As indicated above, it is necessary for the authorisation proxy 25 to identify the presentity 20 so that it can determine if the watcher 24 is authorised to receive the in-directed content from the content server 22. In other words, the authorisation proxy 25 needs to know which of a potentially large number of presence elements (i.e. users accessing the IMS who subscribe to the presence service) is the presentity 20 that the content is associated with. This can be achieved in several ways.

One possibility is to include information that identifies the presentity 20 with the content that is uploaded to the content server 22 at step 201 in FIG. 2. In this case, when the authorisation proxy 25 receives the request for content from the watcher 24 at step 208, the authorisation proxy first contacts the content server 22 which then returns the information. The information may just be an identifier of the presentity 20, or it may also include the full requested content. The authorisation proxy 25 then carries out the authorisation check (steps 209 and 210 in FIG. 2) before any of the content data is passed to the watcher 24. In this case, the presentity's client/UE and the content server 22 must be configured to provide the identifier, but there are no additional requirements placed on the watcher 24.

Another possibility is for the watcher 24 to include information about the identity of the presentity 20 when, at step 208, it sends the request for the content to the authorisation proxy 25. In this case the watcher's client/UE must be configured to provide the information with the request.

A third possibility is to include an identifier for the presentity 20 in the link URL sent to the content in the content server 22 with the SIP PUBLISH message at step 202. As the URL is the address used by the watcher 24 to fetch the data from the content server 22, the presentity identifier is automatically included in the request sent to the authorisation proxy 25. For example the URL:

http://ericsson.com/content/status-icon/my icon.gif includes the "status-icon" as an identifier of the presentity 20 that indicates which presence element the content my_icon.gif is associated with. The authorisation proxy 25 can then use this when verifying authorization. In this case, the presentity 20, after uploading the content to the content server 22 (step 202) must be configured to add the identifier (status-icon) into the URL before it sends this with the SIP NOTIFY message to the presence server 23. In addition, it can be beneficial for the URL to include an entire namespace when defining the elements that are to be found in an XML document. This may be added as a URI query parameter, e.g http://someurl/content/my icon.jpg?urn:ietf:params:xml:ns:pidf:rpid:status-icon A further solution is to make the authorisation proxy 25 "presence aware". In this case the presence XDMS 21 keeps the authorisation proxy 25 up-dated with a presence document identifying the active presence elements. Thus it can check the presence document and find the identity of the presentity 20 (i.e. the identity of the presence element that sent the SIP NOTIFY message to the presence server with the content indirection link included). For example, the Authorisation Proxy 25 may subscribe to the presence service and may request presence information of the presentity 20, using the ID of the presentity 20 as a watcher ID. In that case, it will receive the all presence information related to the presentity 20 (because the presence server will think that it is the presentity 20 itself that is requesting all its own presence information). By checking this document it can find out which elements contain which links. Thus, the Authorisation Proxy 25 can see that the element <status-icon> contains the link "http://content server/image1.jgp". Therefore, when the watcher 24 sends a HTTP GET /image1.jgp request the authorisation proxy 25 knows that it needs to check that the watcher 24 is allowed to see the element <status-icon>.

This solution is particularly suitable when the authorisation proxy 25 and the presence server 23 are co-located in the same IMS network node. In this case there are no constraints on the chosen URL and no additional requirements placed on the configuration of the presentity 20 or the watcher 24 in order to access the in-directed content from the content server.

Figure 4:
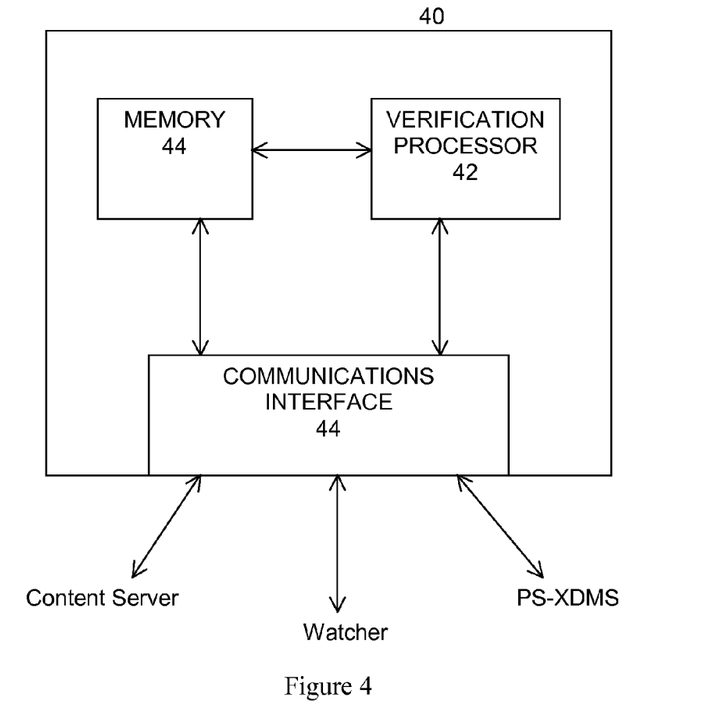
FIG. 4 is a schematic illustration of a network node according to an embodiment of the invention.

FIG. 4 is a schematic illustration of a network node 40 configured to act as an authorisation proxy. The authorisation proxy node 40 includes a verification processor 42 (which may be embodied in a central processor of the node), a communications interface 44, and a memory 46. Signals to and from other network entities are sent or received via the interface 44. The signals received include: requests from users for in-directed content associated with a presentity, the requests including a link to a content server from which the in-directed content can be accessed; presence authorisation rules, and/or other presence data if the authorisation proxy is presence aware, from the presence XDMS 22; and in-directed content provided from the content server. The signals sent include: requests for presence authorisation rules, and/or other presence data; requests forwarded to content servers for in-directed content; and in-directed content data forwarded back to users. The memory 46 stores data and program instructions, and the verification processor 42 implements the program instructions so that, on receiving a request for in-directed content, the authorisation proxy retrieves the authorisation rules and verifies that the user is authorised to receive the requested in-directed content. Once the authorisation is verified, the program instructions then provide that the authorisation proxy node 40 sends a request to the content server identified in the link to be provided with the in-directed content.

The program instructions also enable the network node 40 to obtain an identification of the presentity with which the in-directed content is associated prior to verification of authorisation of the user. Any of the methods described above may be employed fro this purpose.

The network node 40 may be a stand-alone network entity, or may be part of, or co-located with another entity, for example the presence server 22 providing the presence service, or the content server that provides the requested in-directed content. In such cases, some of the communications signals may be handled internally of the network node, rather than through the communications interface 44.

Figure 5:
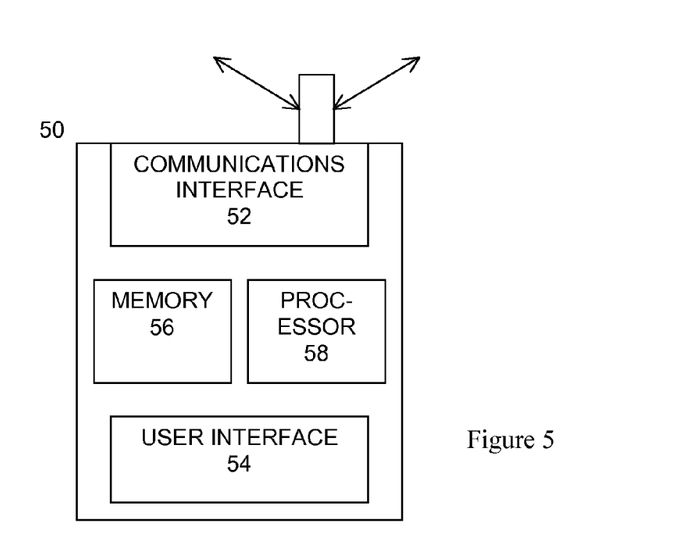
FIG. 5 is a schematic illustration of a user terminal according to an embodiment of the invention.

FIG. 5 is a schematic illustration of a UE 50, such as a mobile telecommunications terminal. The UE 50 is configured for accessing an IP communications network that includes a presence service. The UE includes a communications interface 52 for sending and receiving signals, a user interface 54, a memory 56 storing adapt and program instructions, and a processor 58 that implements the instructions. The instructions include instructions, responsive to a user input via the interface 54 that cause the processor 58 to send a signal to the network that includes an indication to the presence service that in-directed content is available to be downloaded from a content server by authorised users of the presence service. In addition, the processor 58 causes the UE 50 to send an identifier of the UE, associating it with the in-directed content. The identifier is inserted into a URL that identifies a location of the in-directed content at the content server.

Instead, or in addition, when the UE receives a signal from the presence service that includes a notification that in-directed content associated with a presentity is available to be downloaded from a content server, this information is stored in the memory 56. When subsequently, the user decides to access the in-directed content via the user interface 54, the instructions acted on by the processor 58 cause the UE 50 to send a message to the network requesting the in-directed content. The message includes an identifier of the presentity associated with the in-directed content.

The invention claimed:

1. A method of authorising provision of in-directed content to a user of an IP communications network, said in-directed content being associated with a presentity subscriber of a presence service, the presence service including authorisation rules regarding users to which the in-directed content may be provided, and wherein the in-directed content is stored at a content server that is not controlled by the presence service, the method comprising:
   receiving, at an authorisation proxy in the network, a request from the user to be provided with the in-directed content, wherein
      the authorisation proxy is configured, upon receiving the request for in-directed content, to make use of the presentity's subscriber's own presence data to ascertain which presence element is associated with the in-directed content, and
      the authorisation proxy is made presence aware by receiving information updates that include information identifying the presentity subscriber associated with the in-directed content;
   identifying the presentity subscriber associated with the requested in-directed content;
   the authorisation proxy retrieving the authorisation rules to verify that the user is authorised to receive the in-directed content;
   subject to the verification, enabling the in-directed content to be provided from the content server the user; and
   receiving at a presence server in the network, a notification that the in-directed content is available, the notification including an indication of a location from which the in-directed content can be retrieved, the presence server checking the authorisation rules and forwarding the notification to users authorised to receive the in-directed content.

2. The method of claim 1, wherein the notification comprises presence information published by the presentity subscriber to the presence server via a SIP PUBLISH request.

3. The method of claim 1, wherein the indication of the location of the in-directed content is an uniform resource locator (URL).

4. The method of claim 1, wherein the in-directed content associated with the presentity subscriber comprises data uploaded to the content server from the presentity subscriber.

5. The method of claim 4, wherein the uploaded data includes information identifying the presentity subscriber and wherein the step of identifying the presentity subscriber comprises obtaining the information identifying the presentity subscriber from the content server.

6. The method of claim 5, wherein the authorisation proxy forwards the request from the user to the content server, and wherein the content server responds by providing the information identifying the presentity subscriber to the authorisation proxy.

7. The method of claim 1, wherein the request from the user includes an identifier identifying the presentity subscriber.

8. The method of claim 7, wherein an identifier identifying the presentity subscriber is inserted into an uniform resource locator (URL) prior to forwarding of said notification to the authorised users, the URL being sent with the request from the user to the authorisation proxy so that the authorisation proxy can identify the presentity subscriber.

9. The method of claim 8, wherein the identifier is inserted into the URL by the presentity subscriber.

10. The method of claim 8, wherein the identifier is inserted Into the URL by the presence server.

11. The method of claim 1, wherein the authorisation proxy uses a SIP Subscribe for presence R-URI to obtain the presentity subscriber's own presence data.

12. The method of claim 1, wherein the authorisation rules comprise an extensible markup language (XML) rules document provided from an XML document server.

13. The method of claim 1, wherein the IP communications network comprises an IP Multimedia Subsystem (IMS).

14. A network node of an IP communications network, the node comprising:
- an authorisation proxy operable to receive from a user a request for in-directed content, wherein the authorisation proxy is made presence aware by receiving information updates that include information identifying an presentity subscriber, associated with the in-directed content and wherein the authorisation proxy is configured upon receiving the request for in-directed content to make use of the presentity subscriber's own presence data to ascertain which presence element is associated with the in-directed content wherein the in-directed content is associated with a presentity subscriber of a presence service, and wherein the in-directed content is stored at a content server that is not controlled by the presence service, the authorisation proxy being configured to verify that the user is authorised to receive the requested in-directed content, in accordance with authorisation rules of the presence service; and
- a presence server operable to receive a notification that the in-directed content is available, the notification including an indication of a location from which the in-directed content can be retrieved, the presence server further being configured to check the authorisation rules and forward the notification to users authorised to receive the in-directed content.

15. The network node of claim 14 configured, on receipt of the request, to retrieve an authorisation rules document from a document server.

16. The network node of claim 15 configured to obtain an identification of the presentity prior to verification of authorisation of the user.

17. The network node of claim 14, wherein the network comprises an IP Multimedia Subsystem (IMS).

* * * * *

UNITED STATES PATENT AND TRADEMARK OFFICE
CERTIFICATE OF CORRECTION

PATENT NO. : 8,566,954 B2
APPLICATION NO. : 12/865445
DATED : October 22, 2013
INVENTOR(S) : Boberg et al.

It is certified that error appears in the above-identified patent and that said Letters Patent is hereby corrected as shown below:

On the Title Page, in Item (57), under "ABSTRACT", in Column 2, Line 2, delete "IPcommunications" and insert -- IP communications --, therefor.

In the Drawings

In Fig. 3, Sheet 3 of 4, delete Tag "210c" and insert Tag -- 210b --, therefor.

In Fig. 4, Sheet 4 of 4, delete "  " and insert --  --, therefor.

In the Specification

In Column 1, Line 46, delete "Call/Session" and insert -- Call Session --, therefor.

In Column 7, Line 7, delete "e.g" and insert -- e.g., --, therefor.

In Column 7, Line 28, delete ""http://content server/image1.jgp"." and insert -- "http://content server/image1.jpg". --, therefor.

In Column 7, Line 29, delete "HTTP GET /image1.jgp" and insert -- HTTP GET /image1.jpg --, therefor.

In Column 7, Line 51, delete "XDMS 22;" and insert -- XDMS 21; --, therefor.

In Column 8, Line 3, delete "fro this" and insert -- for this --, therefor.

Signed and Sealed this
Twenty-third Day of December, 2014

Michelle K. Lee
*Deputy Director of the United States Patent and Trademark Office*

CERTIFICATE OF CORRECTION (continued)
U.S. Pat. No. 8,566,954 B2

In Column 8, Line 6, delete "presence server 22" and insert -- presence server 23 --, therefor.

In the Claims

In Column 9, Line 10, in Claim 3, delete "is an" and insert -- is a --, therefor.

In Column 9, Line 29, in Claim 8, delete "into an" and insert -- into a --, therefor.

In Column 9, Line 37, in Claim 10, delete "Into" and insert -- into --, therefor.

In Column 10, Line 12, in Claim 14, delete "subscriber," and insert -- subscriber --, therefor.

In Column 10, Lines 13-14, in Claim 14, delete "configured" and insert -- configured, --, therefor.

In Column 10, Line 16, in Claim 14, delete "content" and insert -- content, --, therefor.